United States Patent
Casparian et al.

(10) Patent No.: US 8,319,782 B2
(45) Date of Patent: Nov. 27, 2012

(54) SYSTEMS AND METHODS FOR PROVIDING SCALABLE PARALLEL GRAPHICS RENDERING CAPABILITY FOR INFORMATION HANDLING SYSTEMS

(75) Inventors: Mark A. Casparian, Miami, FL (US); Frank C. Azor, Miami, FL (US); Brian P. Cooper, Miami, FL (US); Jeffrey A. Cubillos, Miami, FL (US); Kevin P. O'Neill, Miami, FL (US); Asif Rehman, Brampton (CA); Chris S. Wetzel, San Antonio, TX (US)

(73) Assignee: Dell Products, LP, Round Rock, TX (US)

( * ) Notice: Subject to any disclaimer, the term of this patent is extended or adjusted under 35 U.S.C. 154(b) by 852 days.

(21) Appl. No.: 12/217,762

(22) Filed: Jul. 8, 2008

(65) Prior Publication Data

US 2010/0007668 A1    Jan. 14, 2010

(51) Int. Cl.
G06F 15/80 (2006.01)
G06F 15/16 (2006.01)
G06F 13/14 (2006.01)

(52) U.S. Cl. .................. 345/505; 345/502; 345/520
(58) Field of Classification Search .......... 345/501–506, 345/519, 520, 522
See application file for complete search history.

(56) References Cited

U.S. PATENT DOCUMENTS

| | | | |
|---|---|---|---|
| 6,772,265 B2 * | 8/2004 | Baweja et al. | 710/303 |
| 7,233,964 B2 | 6/2007 | Bakalash et al. | |
| RE40,741 E * | 6/2009 | Simmonds et al. | 345/502 |
| 7,561,163 B1 * | 7/2009 | Johnson | 345/502 |
| 2005/0190190 A1 * | 9/2005 | Diard et al. | 345/502 |
| 2006/0106591 A1 | 5/2006 | Bordes et al. | |
| 2006/0232590 A1 | 10/2006 | Bakalash et al. | |
| 2006/0267989 A1 * | 11/2006 | Campbell et al. | 345/502 |
| 2006/0279577 A1 | 12/2006 | Bakalash et al. | |
| 2007/0279411 A1 | 12/2007 | Bakalash et al. | |
| 2007/0291040 A1 | 12/2007 | Bakalash et al. | |
| 2007/0294454 A1 * | 12/2007 | Danilak | 710/305 |
| 2008/0068389 A1 | 3/2008 | Bakalash et al. | |
| 2008/0074428 A1 | 3/2008 | Bakalash et al. | |
| 2008/0074429 A1 | 3/2008 | Bakalash et al. | |
| 2008/0074431 A1 | 3/2008 | Bakalash et al. | |
| 2009/0066705 A1 * | 3/2009 | Casparian et al. | 345/503 |

FOREIGN PATENT DOCUMENTS

| | | |
|---|---|---|
| WO | WO2005/050557 A2 | 6/2005 |
| WO | WO2005/050557 A3 | 6/2005 |
| WO | WO2008/004135 A2 | 1/2008 |

* cited by examiner

*Primary Examiner* — Xiao M. Wu
*Assistant Examiner* — Andrew Shin
(74) *Attorney, Agent, or Firm* — O'Keefe, Egan, Peterman & Enders LLP

(57) ABSTRACT

Systems and methods for providing scalability of multiple graphic processor units (GPU) that work together in a multi-coprocessor fashion to provide parallel graphics rendering methodology for an information handling system. The total number of active GPUs working together to provide parallel graphics rendering methodology for a given information handling system may be increased in a modular manner beyond one or two GPUs, e.g., so as allow as many GPUs as desired to be attached to a given information handling system such as a desktop computer or notebook computer.

25 Claims, 7 Drawing Sheets

SYSTEMS AND METHODS FOR PROVIDING SCALABLE PARALLEL GRAPHICS RENDERING CAPABILITY FOR INFORMATION HANDLING SYSTEMS

FIELD OF THE INVENTION

This invention relates generally to graphics processing and, more particularly, to parallel graphics data rendering.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as desktop and notebook computers, have been provided with dual graphic processor units (GPU) mounted on the motherboard of the computer. Information handling systems have been so provided with two GPUs in order to process graphics data and render different portions of a scene to be displayed on a monitor coupled to the computer. In this regard, a first one of the two GPUs is used to process and render a first half of a given scene and the second one of the GPUs is used to simultaneously process and render the second and remaining half of the same given scene. The separately rendered two halves of the given scene are then assembled and displayed together on a monitor coupled to the information handling system.

Information handling systems have also been provided with two external graphics cards that each include a GPU that is connected to motherboard processing of the information handling system by a peripheral component interconnect express (PCI-E) bus. A combination of parallel graphics rendering methodology with dual GPU configurations has been employed to eliminate bottlenecks associated with single GPU configurations and graphics rendering. Three types of parallel graphics rendering methodology are object division parallel graphics rendering, image division parallel graphics rendering, and time division parallel graphics rendering.

SUMMARY OF THE INVENTION

Disclosed herein are systems and methods for providing scalability of multiple graphic processor units (GPU) that work together in a multi-coprocessor fashion to provide parallel graphics rendering methodology for an information handling system. The disclosed systems and methods may be advantageously implemented in one embodiment to allow the total number of active GPUs working together to provide parallel graphics rendering methodology for a given information handling system to be increased in a modular manner beyond one or two GPUs, e.g., so as allow a virtually unlimited number of GPUs to be attached as desired to a given information handling system such as a desktop computer or notebook computer, and without being limited by the internal volume capacity limitations of a particular information handling system chassis (e.g., tower or notebook computer chassis). Further advantageously, the disclosed systems and methods may be implemented in one embodiment in a manner that is independent or without regard to the given vendor/s of the selected GPU chips to be combined, as well as in a manner that is independent or without regard to the proprietary multi-GPU methodology of each GPU chip supplier. In one exemplary embodiment, the disclosed systems and methods may be further advantageously implemented using an off-the-shelf (COTS) desktop motherboard, i.e., without requiring a motherboard specifically designed or configured to implement the disclosed systems and methods. Another exemplary embodiment may be advantageously implemented to provide the ability to support more than two GPUs with a notebook computer system by employing a docking station that supports a configuration of the disclosed systems and methods, e.g., even to the point of allowing modular additions of additional cascadable GPUs to the system.

In one respect disclosed herein is an information handling system, including: a motherboard including circuitry; a primary graphics card coupled to the motherboard, the primary graphics card including at least one first graphics card graphics processing unit (GPU) and at least one graphics hub coupled to the first graphics card GPU by a first data bus; and at least one secondary graphics card including at least one second graphics card GPU thereon, the at least one second graphics card GPU being coupled to the graphics hub of the primary graphics card by a second data bus that creates a signal path that is completely separate from the motherboard. The graphics hub of the primary graphics card may be coupled to receive signals from the circuitry of the motherboard; and the graphics hub may be further configured to provide signals to the first graphics card GPU by the first data bus and to the second graphics card GPU by the second data bus to enable parallel graphics rendering using the first graphics card GPU and the second graphics card GPU.

In another respect, disclosed herein is a portable information handling system assembly, including: a portable information handling system, the portable information handling system including: a motherboard including circuitry, and a primary graphics card, the primary graphics card including at least one first graphics card graphics processing unit (GPU) and at least one graphics hub coupled to the first graphics card GPU by a first data bus, the graphics hub also being coupled to receive signals from the circuitry of the motherboard; and a docking station for the portable information handling system, the docking station being configured to be removeably coupled to the portable information handling system by a docking expansion interconnect, and the docking station including: at least one secondary graphics card including at least one second graphics card GPU thereon, the at least one second graphics card GPU being configured for coupling to the graphics hub of the primary graphics card of the portable information handling system by a second data bus and the docking expansion interconnect when the portable information handling system is docked with the docking station. The graphics hub may be further configured to provide signals to the first graphics card GPU by the first data bus and to the second graphics card GPU by the second data bus via the docking expansion interconnect to enable parallel graphics rendering using the first graphics card GPU and the second graphics card GPU.

In another respect, disclosed herein is a method of configuring an information handling system, including: providing a motherboard including circuitry; providing a primary graphics card coupled to the motherboard, the primary graphics card including at least one first graphics card graphics processing unit (GPU) and at least one graphics hub coupled to the first graphics card GPU by a first data bus, and the graphics hub of the primary graphics card being coupled to receive signals from the circuitry of the motherboard; and providing at least one secondary graphics card including at least one second graphics card GPU thereon, the at least one second graphics card GPU being coupled to the graphics hub of the primary graphics card by a second data bus that creates a signal path that is completely separate from the motherboard. The graphics hub may be further configured to provide signals to the first graphics card GPU by the first data bus and to the second graphics card GPU by the second data bus to enable parallel graphics rendering using the first graphics card GPU and the second graphics card GPU.

In another respect, disclosed herein is a method of configuring a portable information handling system assembly, including: providing a portable information handling system, the portable information handling system including a motherboard including circuitry, and a primary graphics card, the primary graphics card including at least one first graphics card graphics processing unit (GPU) and at least one graphics hub coupled to the first graphics card GPU by a first data bus, the graphics hub also being coupled to receive signals from the circuitry of the motherboard; providing a docking station for the portable information handling system, the docking station being configured to be removeably coupled to the portable information handling system by a docking expansion interconnect, and the docking station including: at least one secondary graphics card including at least one second graphics card GPU thereon, the at least one second graphics card GPU being configured for coupling to the graphics hub of the primary graphics card of the portable information handling system by a second data bus and the docking expansion interconnect when the portable information handling system is docked with the docking station. The graphics hub may be further configured to provide signals to the first graphics card GPU by the first data bus and to the second graphics card GPU by the second data bus via the docking expansion interconnect to enable parallel graphics rendering using the first graphics card GPU and the second graphics card GPU.

In another respect, disclosed herein is a scaleable circuit assembly for an information handling system, including: a first modular component including a first parallel graphics rendering graphics hub coupled to at least one graphics processing unit (GPU), the first modular component being configured for coupling to a motherboard of an information handling system such that the first parallel graphics rendering graphics hub receives signals from one or more components of the motherboard; and a first additional modular component separate from the first modular component, the first additional modular component including a second parallel graphics rendering graphics hub coupled to at least one GPU of the first additional modular component, the first additional modular component being configured for coupling to the first modular component such that the first and second parallel graphics rendering graphics hubs are coupled together with the first parallel graphics rendering graphics hub being coupled between the second parallel graphics rendering graphics hub and the motherboard.

In another respect, disclosed herein is a method of configuring a portable information handling system assembly, including: providing an information handling system, the information handling system including a motherboard; providing a first modular component including a first parallel graphics rendering graphics hub coupled to at least one graphics processing unit (GPU), and coupling the first modular component to the motherboard of the information handling system such that the first parallel graphics rendering graphics hub receives signals from one or more components of the motherboard; and providing a first additional modular component separate from the first modular component, the first additional modular component including a second parallel graphics rendering graphics hub coupled to at least one GPU of the first additional modular component, and coupling the first additional modular component to the first modular component such that the first and second parallel graphics rendering graphics hubs are coupled together with the first parallel graphics rendering graphics hub being coupled between the second parallel graphics rendering graphics hub and the motherboard.

DESCRIPTION OF ILLUSTRATIVE EMBODIMENTS

Figure 1:
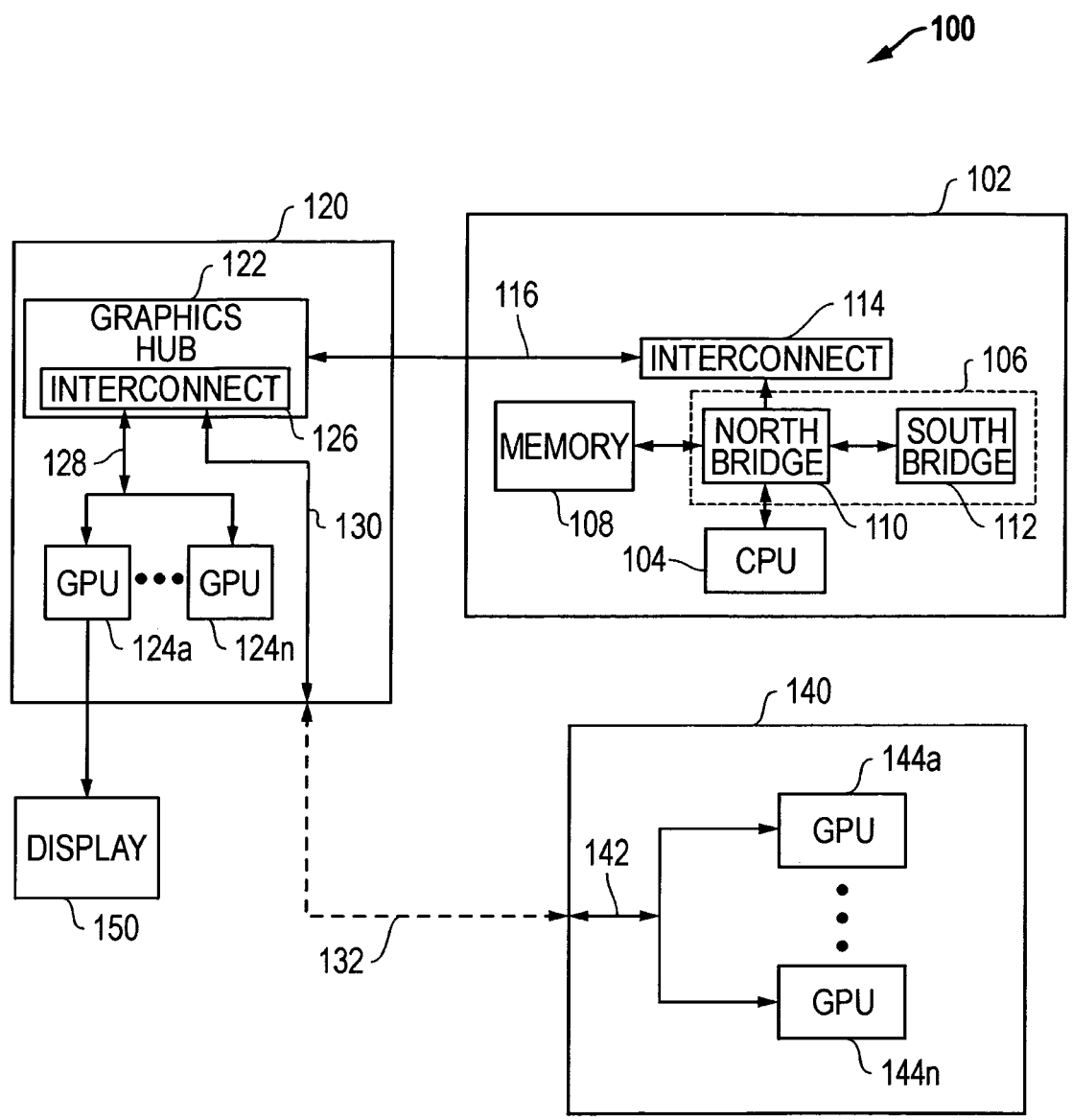
FIG. 1 illustrates an information handling system according to one exemplary embodiment of the disclosed systems and methods.

FIG. 1 illustrates an information handling system 100 according to one exemplary embodiment of the disclosed systems and methods as it may be configured with scalable parallel graphics rendering capability. As shown, information handling system 100 of FIG. 1 includes motherboard 102 having core logic chipset 106 that includes north bridge chip 110 (e.g., graphics and memory controller hub) and south bridge chip 112 (e.g., I/O controller hub). Also present are memory (e.g., RAM) 108 and central processing unit (CPU)

104. As shown, north bridge chip 110 is coupled to data bus interconnect 114 (e.g., implemented by a high speed graphics connector pair such as PCI-express connector pair or accelerated graphics port "AGP" connector pair, etc.) for coupling to graphics cards via high speed graphics data bus 116 as described further below.

Also shown in FIG. 1 is primary graphics card 120 that is provided as a separate printed circuit board card (e.g., as a riser, backplane card, other modular component configuration, non-modulized circuit assembly, etc.) from motherboard 102. Graphics card 120 is provided with a graphics hub device 122 having an internal interconnect 126 that is configured for coupling as shown via high speed graphics data bus 116 to interconnect 114 of motherboard 102. Primary graphics card 120 also includes one or more (e.g., two or more in one exemplary embodiment) first graphics card GPUs 124a to 124n (e.g., commercial off-the-shelf GPUs such as those available from nVidia, ATI, etc.) that are also coupled to interconnect 126 via high speed graphics data bus 128. In the illustrated embodiment, GPU 124a is provided as a primary GPU for coupling to display device 150. It will also be understood that, other than electrical interconnection circuitry, primary graphics card 120 may or may not be mechanically coupled to motherboard 102. In one embodiment, graphics hub 122 may be implemented in a manner that also operates as a PCI-E switch, which is connected to data bus interconnect 114 (implemented by a PCI-E connector pair) and provides at least two algorithmically modified lanes, one to first GPU 124a and the other to at least a second GPU 124n. Interconnect 126 of graphics hub 122, data bus 128 and primary graphics card 120 may also be optionally configured to allow addition, removal or replacement of one or more GPUs 124 on primary graphics card 120.

As further shown in FIG. 1, a second and separate graphics card 140 may be provided as a printed circuit board card (e.g., as a riser, backplane card, other modular component configuration, non-modulized circuit assembly, etc.) separate from both motherboard 102 and primary graphics card 120. In this exemplary embodiment, secondary graphics card 140 may be provided as shown with one or more (e.g., two or more in one exemplary embodiment) second graphics card GPUs 144a to 144n that may be coupled to interconnect 126 of graphics hub 122 via a high speed graphics data bus 130 provided on primary graphics card 120 and a high speed graphics data bus 142 provided on secondary graphics card 140, with a high speed graphics data bus line 132 provided therebetween (e.g., PCI-e extender cable made by Meritec that is made of a 28 AWG Twinax ribbon cable). Interconnect 126 of graphics hub 122, data bus 142 and secondary graphics card 140 may also be optionally configured to allow addition, removal or replacement of one or more GPUs 144 on secondary graphics card 140. In one embodiment, high speed graphics data bus line 132 may be provided separate from high speed graphics data bus 116 of motherboard 102 to create a signal path that is completely separate and removed from motherboard 102, e.g., provided as a stand-alone cable conductor or provided as a separate microstrip line separate from motherboard 102 and that is dedicated for interconnecting GPUs 144 of secondary graphics card 140 to graphics hub 122. It will be understood that, other than electrical interconnection circuitry, secondary graphics card 140 may or may not be physically coupled to motherboard 102.

In the illustrated embodiment of FIG. 1, graphics hub 122 of first graphics card 120 may be implemented using one or more processing components (e.g., chips, ASICs, FPGAs, etc.). In this regard, graphics hub 122 of the illustrated embodiments may be implemented in one exemplary embodiment using scene composition graphics rendering algorithms as described in one or more of WO 2008/004135A2, U.S. Patent Publication No. 2006/0232590A1, U.S. Patent Publication No. 2006/0279577A1, U.S. Publication No. 2007/0279411A1, U.S. Patent Publication No. 2007/0291040A1, U.S. Patent Publication No. 2008/0068389A1, U.S. Patent Publication No. 2008/0074428A1, U.S. Patent Publication No. 2008/0074429A1, U.S. Patent Publication No. 2008/0074431A1, and U.S. Pat. No. 7,233,964, each of which is incorporated herein by reference in its entirety. Such algorithms may either be processed by the host CPU 104, and/or by one or more additional processing components (e.g., chips, custom ASICs, FPGAs, etc.) present in graphics hub 122 that may be provided to off-load some or all of the processing of these algorithms from the host. The resulting algorithmically modified signals may then be output to multiple GPUs 124a to 124n via a corresponding number of data bus streams (e.g., ×8 PCI-E streams) as illustrated.

In one exemplary embodiment, CPU 104 and graphics hub 122 may be configured to together perform one or more parallel graphics rendering functions of a multi-mode parallel 3D graphics rendering system (MMPGRS) such as described in one or more of the foregoing incorporated references. For example, an Automatic Mode Control Module (AMCM) and a first Decomposition Submodule may reside as a software package in the Host Memory Space (HMS) 108, while a second Decomposition Submodule and Distribution Module may be implemented within graphics hub 122 in a manner as described in one or more of the foregoing incorporated references. However, it will be understood that a graphics hub 122 may be implemented by any other configuration of one or more processing components (optionally in combination with one or more CPUs 126) that is suitable for coupling together multiple GPUs for the performance of at least one form of parallel graphics rendering methodology, e.g., object division parallel graphics rendering, image division parallel graphics rendering, and/or time division parallel graphics rendering. Furthermore, it will be understood that in another embodiment all parallel graphics rendering tasks may be accomplished by one or more graphics hub components 122 in a manner that is completely separate from the CPU/s of a motherboard 102.

Using the architecture of FIG. 1, a Recomposition Module as described in the foregoing incorporated references may be implemented in one exemplary embodiment across GPUs 124a to 124n and GPUs 144a to 144n, which all may be simultaneously driven in a parallelized manner under the control of the AMCM implemented on motherboard 102. Additionally, the Decomposition Submodule No. 1 may be employed to transfer graphic commands and data (GCAD) to the Decomposition Submodule No. 2 via the North bridge 110, the Decomposition Submodule No. 2 may be employed to divide the stream of graphic commands and data (GCAD) according to the required current parallelization mode, the Distribution Module may be employed to distribute graphic commands and data (GCAD) to the external GPUs 124a to 124n, the Recomposition Module may be employed to transfer composited pixel data (CPD) between the GPUs 124a to 124n and GPUs 144a to 144n during the image recomposition stage, and finally recomposited pixel data sets (recomposited within the vertex and/or fragment shaders of primary GPU 124a) may be displayed as graphical images on display device/s 150 connected to the primary GPU 124a of primary graphics card 120.

With regard to the exemplary embodiment of FIG. 1, it will be understood that such parallel graphics rendering functions may be distributed between a primary graphics card 120 and motherboard 102 in any other way suitable for performing parallel graphics rendering functions, e.g., tasks of Automatic Mode Control Module (AMCM), first Decomposition Submodule, second Decomposition Submodule, and Distribution Module may all be implemented separately from motherboard 102 on primary graphics card 120 by one or more processors, ASICs, etc. It will also be understood that any number of one or more GPUs 124 may be provided for a primary graphics card 120, that any number of one or more GPUs 144 may be provided for a secondary graphics card 140, and that more than one secondary graphics card may be coupled to primary graphics card 120 in similar manner, as will be described in relation to FIG. 2.

Figure 2:
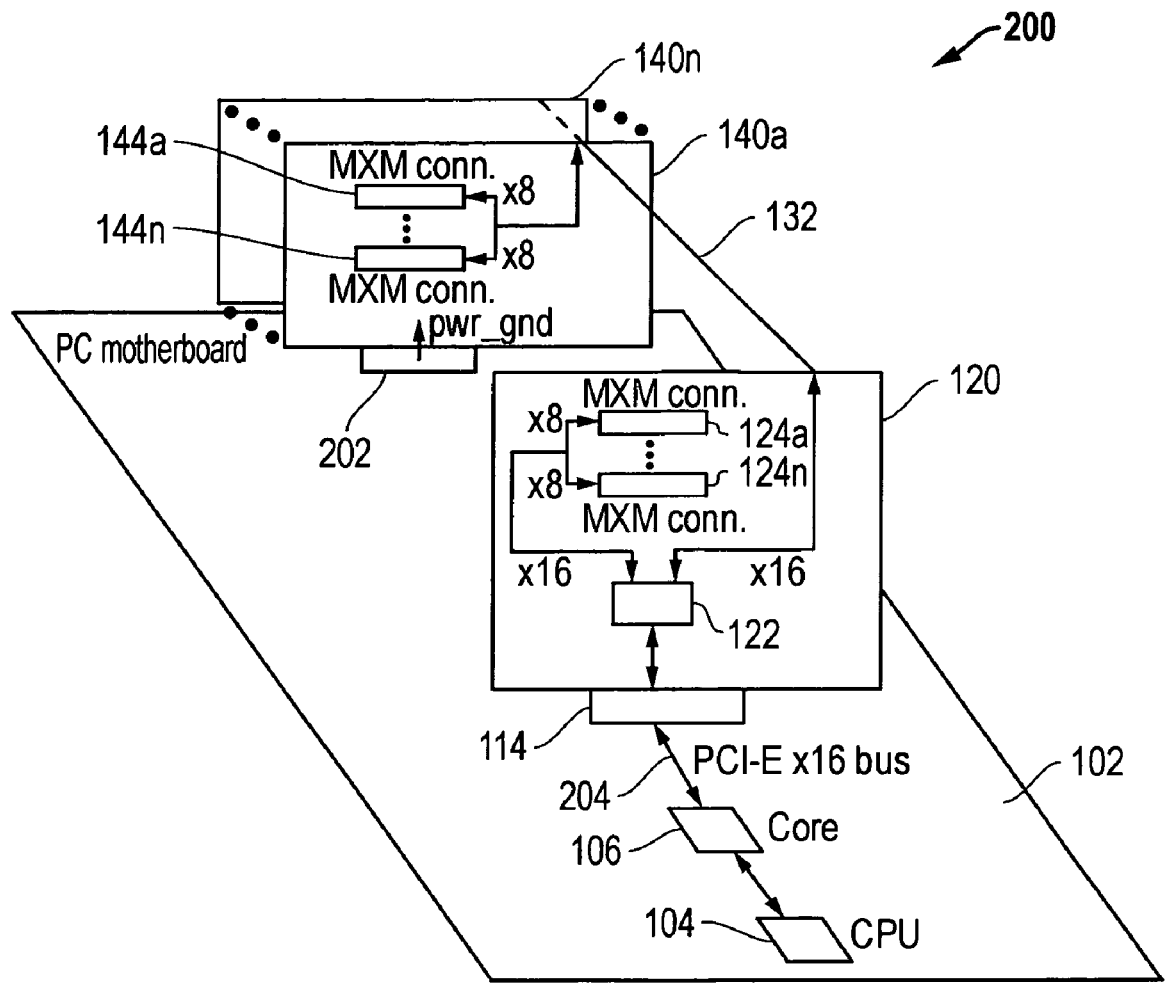
FIG. 2 illustrates an information handling system according to one exemplary embodiment of the disclosed systems and methods.

FIG. 2 illustrates one exemplary embodiment of information handling system (e.g., desktop personal computer) 200 in which primary graphics card 120 is implemented as a customized plug-in PCI-E card that is coupled to core logic chipset 106 of motherboard 102 by a PCI-E×16 interconnect 114 via PCI-E×16 slot in motherboard 102 and PCI-E×16 data bus 204. In one exemplary embodiment, motherboard 102 may be a commercial off the shelf (COTS) desktop computer motherboard of standard form factor (e.g., such as ATX) that includes no hardware modifications to implement the disclosed systems and methods, e.g., the motherboard includes no graphics hub. In this configuration, PCI-E signals (e.g., GCAD, power and ground signals) may all be supplied to components of primary graphics card 120 through PCI-E×16 interconnect 114 which also provides mechanical connection to motherboard 102 for primary graphics card 120. As further shown in FIG. 2, at least one secondary graphics card 140a may be implemented as a customized plug-in PCI-E card and coupled via data bus line 132 to primary graphics card 120 that is coupled to motherboard 102 by PCI-E×16 interconnect 202. In this regard, data bus line 132 may be employed for providing high speed controlled impedance GCAD signals to components of secondary graphics card 140a from primary graphics card 120, while only power and ground signals are supplied to secondary graphics card 140a via PCI-E×16 interconnect 202 that also provides mechanical connection to motherboard 102 (e.g., COTS motherboard) for secondary graphics card 140a. In this exemplary embodiment, primary graphics card 120 includes a graphics hub 122 that receives the PCI-E×16 signals via the backplane from the motherboard, and then outputs algorithmically modified signals to GPUs 124 to 124n of primary graphics card 120 and to GPUs 144a to 144n of each of graphics cards 140a to 140n, e.g., using the scene composition graphics rendering algorithms previously described.

It will be understood that in one exemplary embodiment interconnect 114 may be utilized to allow primary graphics card 120 to be removably coupled (i.e., via a reusable interconnect system such as a reusable connector pair) to motherboard 102 to provide scaleable parallel graphics rendering expansion capability, e.g., in a manner to allow primary graphics card 120 to be optionally and selectably attached to motherboard 102 (e.g., to allow the same motherboard 102 to be used to build-to-order an information handling system 200 with or without primary graphics card 120 based on customer preference or order for parallel graphics rendering capability, or to allow later or after market addition of parallel graphics rendering capability by installation of primary graphics card 120). Similarly, any desired parallel graphics rendering software may be optionally and selectably loaded into memory 108 of motherboard 102 only when needed and/or at such a later time (during or after information handling system assembly) as may be desired. Further, one or more interconnect/s 202 may be utilized to allow one or more secondary graphics cards 120 to also be optionally and selectably provided for information handling system 200 to provide further scaleable parallel graphics rendering expansion capability, e.g., in a manner to allow secondary graphics card 140 to be optionally coupled to primary graphics card 120 (e.g., to allow the same motherboard 102 to be used to build-to-order an information handling system with or without primary graphics cards 120 and 140 based on customer preference for parallel graphics rendering capability, or to allow later or after market addition of parallel graphics rendering capability by installation of primary graphics cards 120 and 140). In this regard, an information handling system may be provided with parallel graphics rendering capability at the time of information handling system assembly (or after assembly) even though its motherboard 102 is provided with no inherent or integral parallel graphics rendering capability.

In one exemplary embodiment, an unmodified commercial off-the-shelf (COTS) motherboard 102 may be employed that has no existing traces provided to transmit the algorithmically modified signals to GPUs 124a to GPU 124n. A high speed data bus 132 in the form of a controlled impedance PCB, PCI-e extender cable, microstrip PCB, etc. that is completely separate from motherboard 102 may be attached as shown from primary graphics card 120 to secondary graphics card/s 140 to provide the necessary signals to support GPUs 124a to 124n. Advantageously, no modification need be made to the COTS motherboard 102 in order to implement scaleable parallel graphics rendering expansion capability. Further advantageously, this embodiment may be implemented to allow four GPUs to be provided internally within a conventional desktop computer chassis (e.g., desktop tower box) for parallel graphics rendering processing using standard form factor motherboards, such as ATX.

As further shown in FIG. 2, each of primary graphics card 120 and secondary graphics card 140a may be provided with GPUs that are implemented as Mobile PCI Express Module standard (MXM) modules, although any other circuit configuration for GPUs 124 and 144 may be alternatively employed. As further illustrated in FIG. 2, additional secondary graphics cards 140 may be provided (e.g., as plug-in PCI-E cards) and coupled via data bus line 132 or via additional optional data bus lines to primary graphics card 120.

Figure 3:
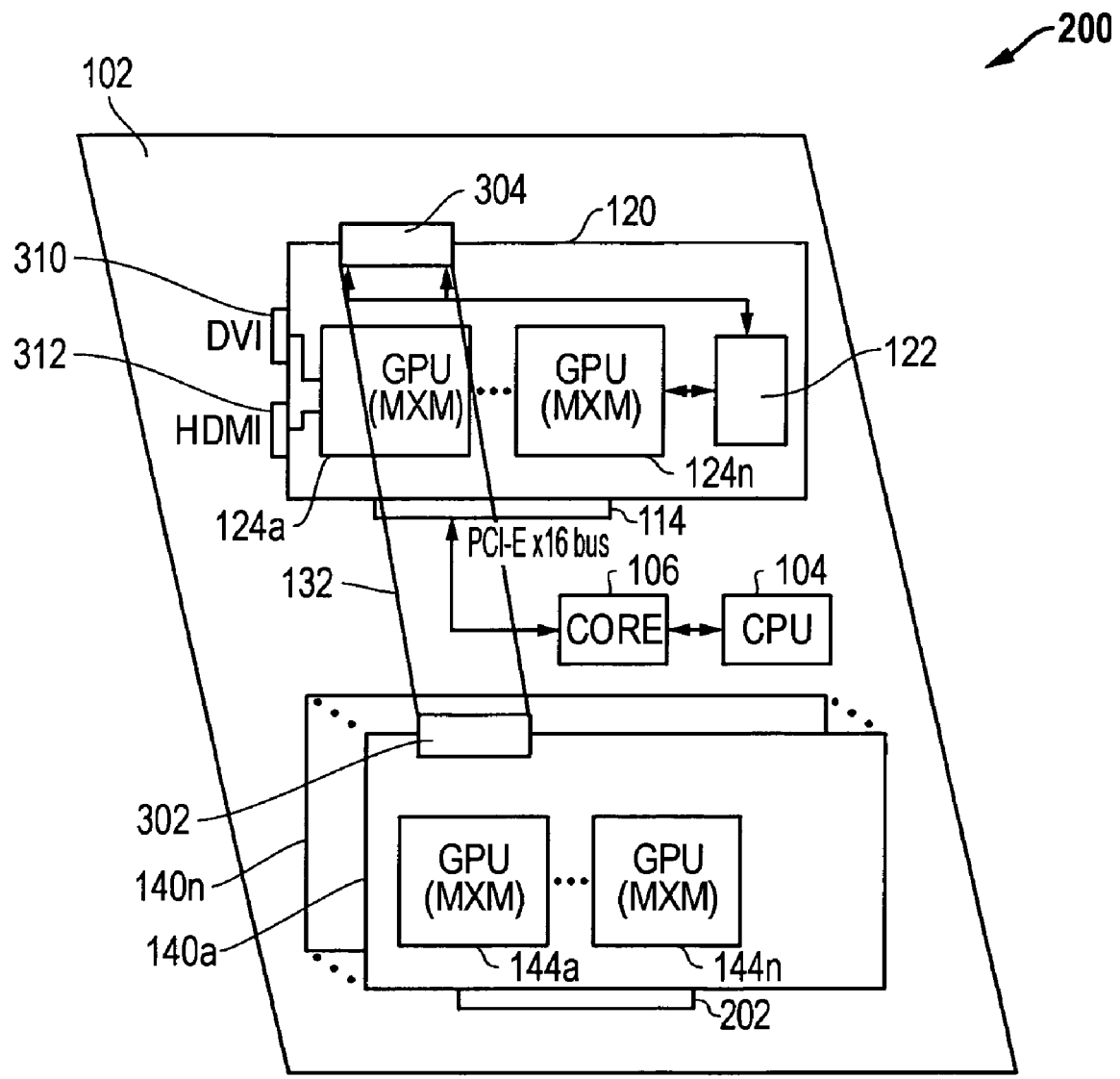
FIG. 3 illustrates an information handling system according to one exemplary embodiment of the disclosed systems and methods.

FIG. 3 is another illustration of the exemplary embodiment of FIG. 2 showing at least one secondary graphics card 140a as it may be coupled (e.g., via PCI-e goldfinger connectors 302 and 304) and data bus 132 (e.g., implemented with a PCI-e extender cable/s) to primary graphics card 120 that is coupled to motherboard 102 by PCI-E×16 interconnect 202. FIG. 3 shows primary graphics card 120 provided with digital video interface (DVI) connector 310 and high definition multimedia interface (HDMI) connector 312 that are each coupled to primary GPU 124a for providing display data to an integrated and/or external display 150, it being understood that any other number and/or types of interface connectors may be so provided from one or more GPUs of information handling system 200.

Figure 4:
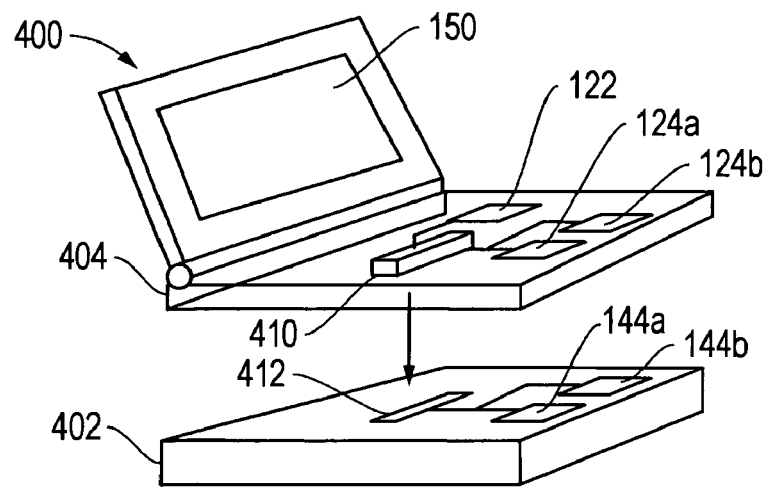
FIG. 4 illustrates a portable information handling system and docking station according to one exemplary embodiment of the disclosed systems and methods.

FIG. 4 shows an exemplary embodiment of an information handling system assembly 400 that includes a portable information handling system in the form of a notebook computer 404 and a docking station 402 as may be configured to provide notebook computer 404 with scalable graphics rendering capability according to one exemplary embodiment of the disclosed systems and methods. In this exemplary embodiment, notebook computer 404 is configured with integrated components that perform the functions of primary graphics card 120 of FIG. 1. In this regard, notebook computer 404 includes integrated internal graphics hub 122 and two integrated internal GPUs 124a and 124b that may be coupled together with an integrated internal CPU and core logic chipset in the manner of FIG. 1, although as few as one integrated internal GPU or more than two integrated integral GPUs may be provided in other embodiments. In the illustrated embodiment of FIG. 4, notebook computer may be capable of parallel graphics rendering using only its integrated graphics hub 122 and two integrated GPUs 124a and 124b, i.e., in a stand alone manner.

As further shown in FIG. 4, a docking station 402 may be provided with additional GPUs in order to provide scaleable parallel graphics rendering expansion capability by providing for interconnection of graphics hub 122 to two additional GPUs 144a and 144b via high speed data bus and docking expansion connectors 410 and 412 that together form a docking expansion interconnect, it being understood that a docking station may be provided with more than two additional GPUs 144 in other embodiments. In such an embodiment, two respective GCAD signals are exchanged between graphics hub 122 and respective GPUs 124a and 124b when notebook computer 404 is operated separately from docking station 402. Two remaining respective GCAD signals from graphics hub 122 are passed through docking expansion connectors 410 and 412 and exchanged with respective GPUs 144a and 144b when notebook computer 404 is docked with docking station 402 in the manner shown by the arrow in FIG. 4. Such an embodiment may be employed to provide for increased four-GPU parallel graphic rendering performance under a first set of conditions (e.g., when gaming at home), while allowing for increased portability and reduced weight without the docking station when two-GPU parallel graphic rendering performance is sufficient under a second set of conditions (e.g., when on travel for work). In other cases, an economy priced notebook computer (i.e., without premium graphics rendering capability) may be enabled with premium graphics rendering performance when docked with docking station 402.

FIGS. 5-9 illustrate exemplary embodiments in which multiple parallel graphics rendering graphics hubs 122a and 122b are coupled together in a cascading manner to support additional GPUs for the performance of parallel graphics rendering methodology.

Figure 5:
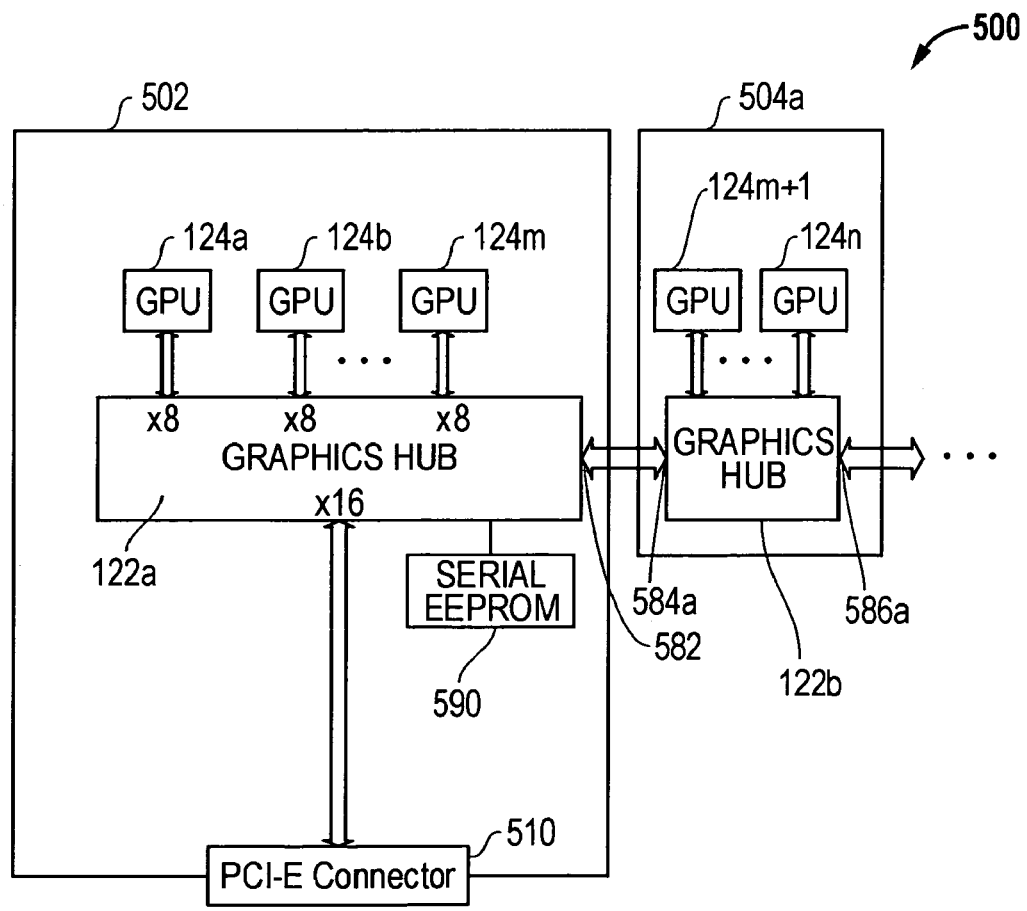
FIG. 5 illustrates a scaleable parallel graphics rendering circuit assembly according to one exemplary embodiment of the disclosed systems and methods.

FIG. 5 shows a scaleable parallel graphics rendering circuit assembly 500 for an information handling system that includes a first graphics hub 122a with multiple ports of ×8 data bus lanes, in this case at least three ×8 data bus lanes for supporting at least three respective first graphics card GPUs $124_a$ and $124_b$ to $124_n$. First graphics hub 122a, GPUs $124_a$ and $124_b$ to $124_m$, memory 590 (e.g., Serial EEProm) and PCI-E connector 510 may be provided as a first modular component 502 (e.g. modular graphics card). PCI-E connector 510 or other suitable high speed graphics data bus connector may be provided for coupling to a mating connector of an information handling system motherboard, e.g., a single PCI-E connector of a motherboard 102 having only one PCI-E connector. A second modular component 504a (e.g. modular graphics card or other suitable modular component assembly) including a second graphics hub 122b supporting at least one respective second graphics card GPU $124_{m+1}$ (or alternatively two or more GPUs $124_{m+1}$ to $124_n$ as shown) may be coupled as shown to graphics hub 122a in cascaded manner. In such an assembly 500, first and second graphics hubs 122a and 122b cooperate to enable each of multiple GPUs of modular component 502 to work together with each of multiple GPUs of modular component 504 to together perform parallel graphics rendering methodology for an information handling system.

In the embodiment of FIG. 5, data bus signals (e.g., PCI-E×16 signals) enter graphics hub 122a (e.g., via the backplane from the CPU and/or core logic chipset of the motherboard) which outputs algorithmically modified signals to GPUs $124_a$ to $124_m$ of modular component 502, e.g., using the scene composition graphics rendering algorithms previously described. As shown, graphics hub 122a is provided with a cascade-out port 582 and graphics hub 122b is provided with a cascade-in port 584a coupled to cascade output port 582 of graphics hub 122a and a cascade-out port 586a. Using these cascade ports, graphics hub 122a provides data bus signals to graphics hub 122b which cooperates with graphics hub 122b and in turn outputs algorithmically modified signals to GPUs $124_{m+1}$ to $124_n$ of modular component 504a in a similar manner.

Figure 6:
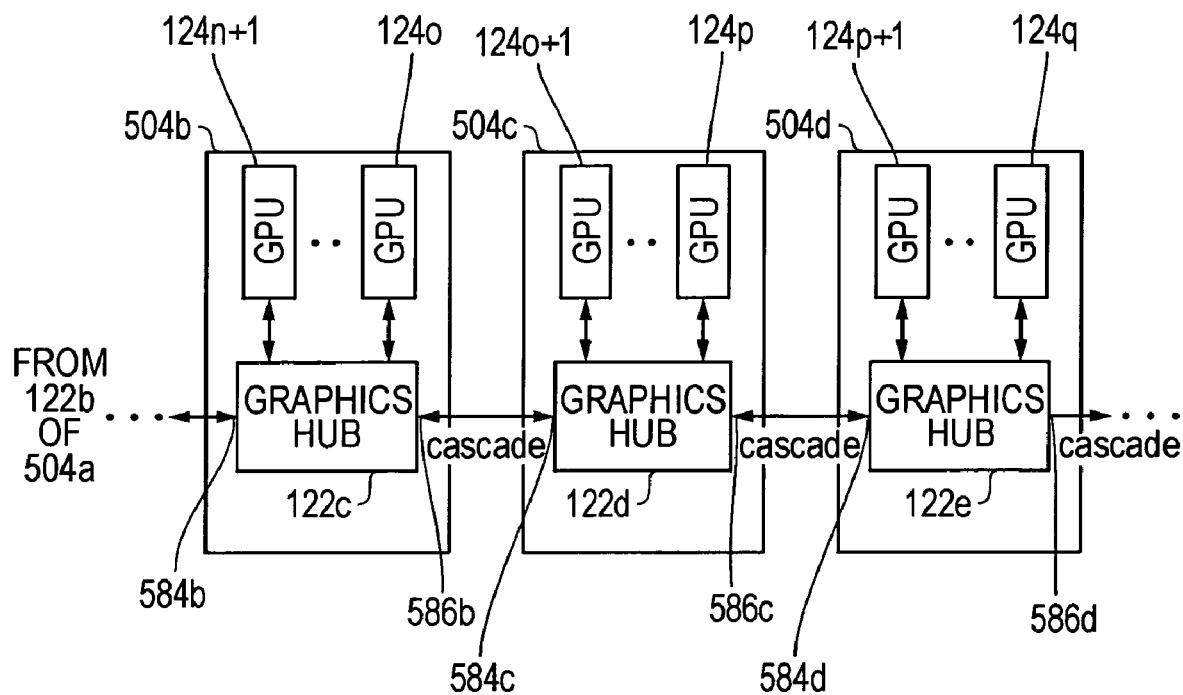
FIG. 6 illustrates modular components according to one exemplary embodiment of the disclosed systems and methods.

FIG. 6 illustrates how additional modular components 504b to 504d (and optionally beyond) may be cascadeably coupled to second modular component 504a using a respective cascade-in port 584 of each of the respective modular components 504 coupled to a corresponding cascade output port 586 of another respective modular component 504, with or without another connection (e.g., for power and ground) to the motherboard of the information handling system. In the exemplary embodiment of FIG. 6, each modular component 504b to 504d includes a respective graphics hub 122 (e.g., configured as a PCI-E switch) and multiple GPUs 124 (i.e., third graphics card GPUs $124_{n+1}$ to $124_o$, fourth graphics card GPUs $124_{o+1}$ to $124_p$, fifth graphics card GPUs $124_{p+1}$ to $124_q$, etc.) operating in parallel, so as to allow an ever-expanding number of parallel operating GPUs 124 to be coupled together as shown. As before, each of modular components 504b to 504d may be an individual graphics card or any other suitable modular component assembly. In the illustrated exemplary embodiment, additional graphics hubs 122d to 122e are shown coupled in a manner to cooperatively enable each of additional multiple GPUs 124 of modular components 504b to 504d to work together with each of multiple GPUs 124 of modular component 502 and each of multiple GPUs of modular component 504a to perform parallel graphics rendering methodology for an information handling system. Such a configuration may be employed in one embodiment to enable a variable and increasing number of parallel operating GPUs to be coupled to an information handling system motherboard that has only one PCI-E (or other type graphics bus) connector.

Figure 7:
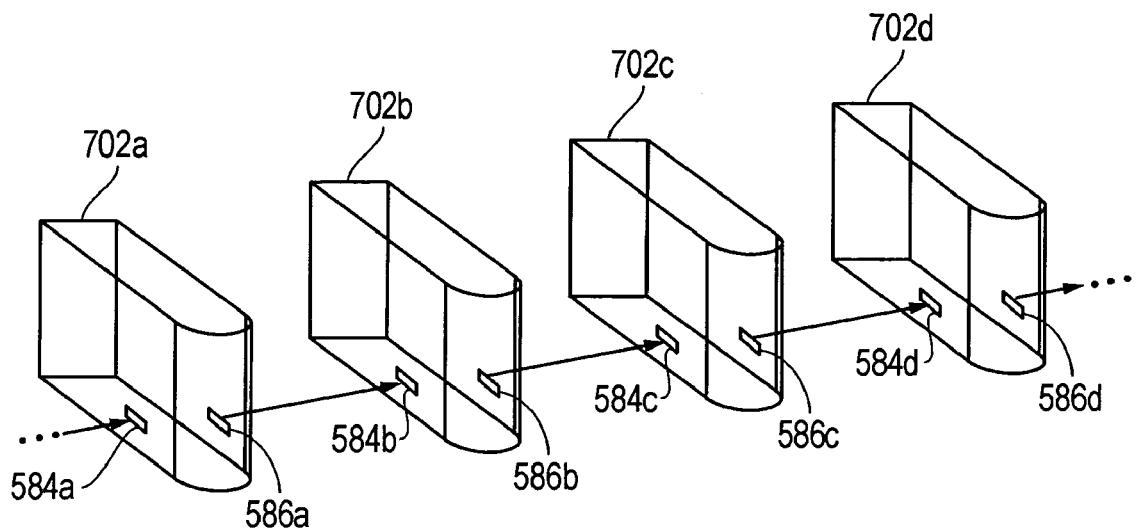
FIG. 7 illustrates modular components according to one exemplary embodiment of the disclosed systems and methods.
Figure 8:
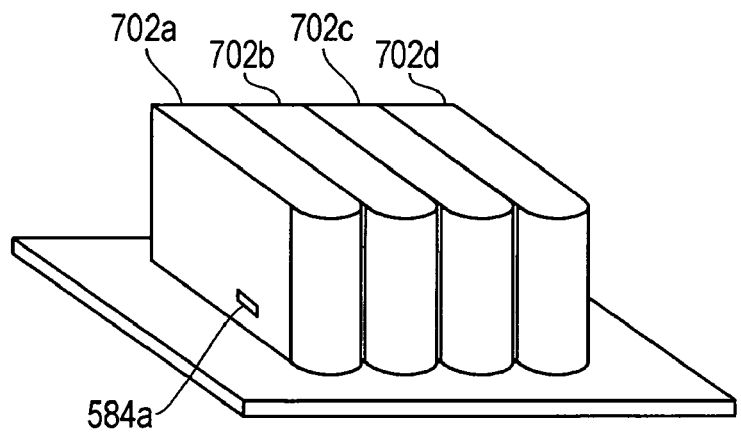
FIG. 8 illustrates modular components according to one exemplary embodiment of the disclosed systems and methods.

FIG. 7 shows one exemplary embodiment in which each of modular components 504 of FIGS. 5 and 6 may be contained in a separate box or housing 702, and coupled together via cascade-in ports 584 and cascade-out ports 586. In one exemplary embodiment, each pair of mating cascade-out connector and cascade-in connector may attach together via a blind, self-aligning type of connector or attachment system. In one exemplary embodiment, each of housings 702 may be configured as a modular bookshelf unit (e.g., that resembles a book), e.g., so that when multiple modular components are attached together, they create the look of a number of books on a bookshelf as shown in FIG. 8. Such an embodiment may be employed with, for example, a desktop or notebook computer configuration of information handling system.

Figure 9:
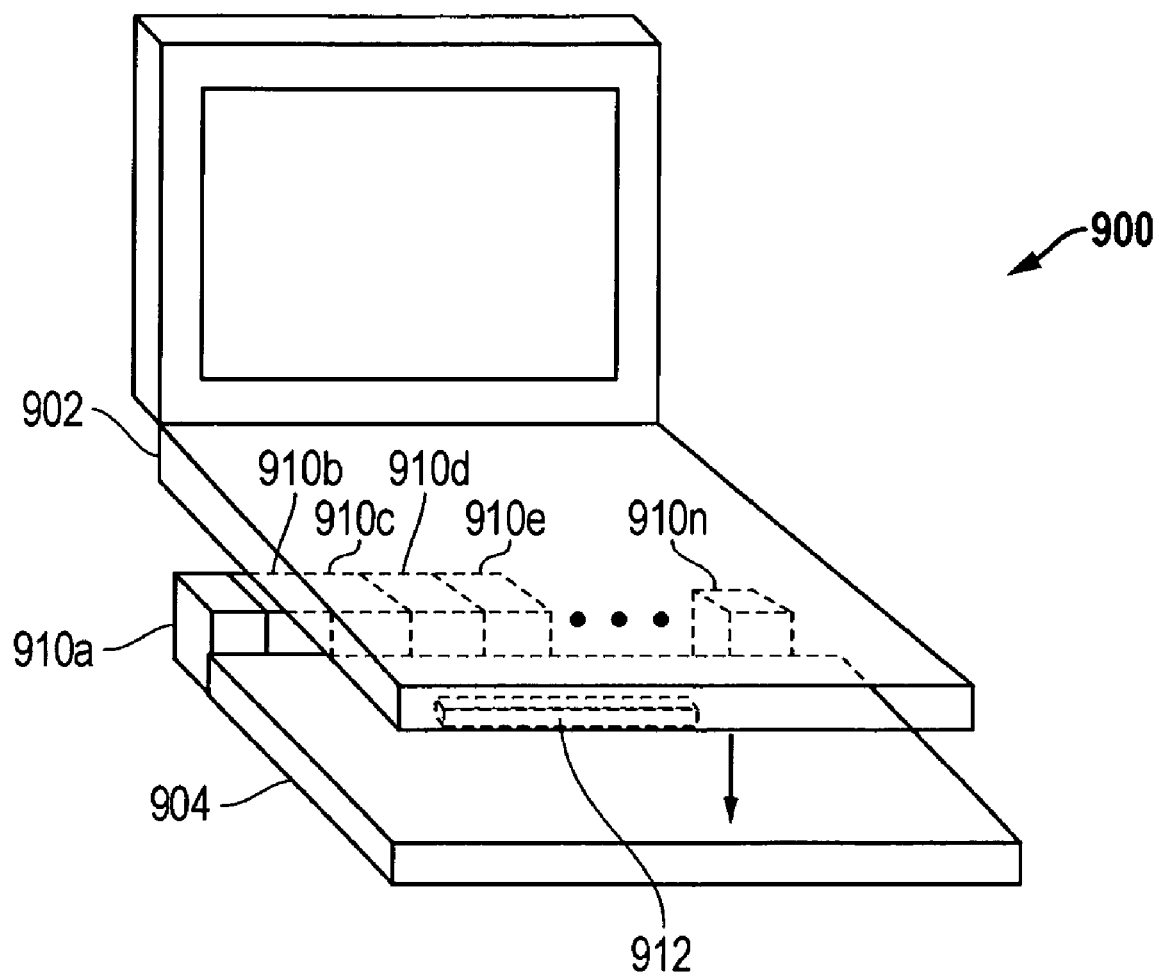
FIG. 9 illustrates a portable information handling system and docking station according to one exemplary embodiment of the disclosed systems and methods.

FIG. 9 illustrates an embodiment of a modularly cascadeable multi-GPU parallel graphics rendering system 900 that is configured to allow an ever-expandable number of GPUs to be added to a portable information handling system in the form of a notebook computer 902. In this embodiment, one or more modular components 910 (each housing a modular component 504 of FIGS. 5 and 6) may be mechanically attachable (e.g., in ad hoc as needed manner) to the backside (or other side/s) of docking station 904 as shown in FIG. 9, or alternatively in a bookshelf unit manner similar to that illustrated in FIG. 8. A data bus high speed graphics connector 912 may be provided for coupling notebook computer 902 to the components of the docking station 904. In another exemplary embodiment, the multiple booklike modular components of FIG. 8 may be stacked on either side of the docking station, e.g., as modular bookshelf units that resemble books stacked on both left and right sides of docking station 904. It will be understood that these embodiments are exemplary only, and that any other configuration of modular components may be coupled together that is suitable for forming a cascadeable system of parallel operating GPUs. Furthermore, it will be understood that the modular component housing configurations of FIGS. 7-9 may be alternatively employed to house and couple together the modular components (e.g., graphics cards) of the embodiments of FIGS. 1-4 as well.

It will be understood that the illustrated embodiments herein are exemplary only, and that a given modular component may include one or more GPUs 124 operatively coupled to a corresponding graphics hub 122, and that the number of cascaded modular components may vary from as few as two (e.g., such as shown in FIG. 5) up to the operative limit of the data bus and graphics processing capability of a given system configuration and its individual components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    a motherboard including circuitry;
    a first modular component including a first parallel graphics rendering graphics hub coupled by a first data bus to at least one first graphics processing unit (GPU) that is part of the first modular component, said first modular component being coupled to the motherboard of the information handling system such that said first parallel graphics rendering graphics hub receives signals from one or more components of said motherboard, and said first parallel graphics rendering graphics hub including a cascade-out port; and
    a first additional modular component separate from said first modular component, said first additional modular component including a second parallel graphics rendering graphics hub coupled to at least one second GPU that is part of said first additional modular component, the second parallel graphics rendering graphics hub having a cascade-in port coupled by a second data bus to the cascade-out port of the first parallel graphics rendering graphics hub with said first additional modular component being coupled to said first modular component such that said first and second parallel graphics rendering graphics hubs are coupled together in cascade relationship with said first parallel graphics rendering graphics hub being coupled between said second parallel graphics rendering graphics hub and said motherboard and such that the second parallel graphics rendering graphics hub is only configured to exchange signals with the motherboard through the cascade-out port of the first parallel graphics rendering graphics hub and the cascade-in port of the second parallel graphics rendering graphics hub;
    where the second parallel graphics rendering graphics hub of the first additional modular component further comprises a cascade-out port configured for coupling to a cascade-in port of a third parallel graphics rendering graphics hub of a second additional modular component separate from said first modular component and said first additional modular component; and
    wherein said first parallel graphics rendering graphics hub is further configured to provide signals to said first GPU by said first data bus and to said second GPU by said second data bus and said second parallel graphics rendering graphics hub to enable parallel graphics rendering using said first GPU and said second GPU.

2. The information handling system of claim 1, wherein said first modular component includes at least two first GPUs; wherein said first additional modular component includes at least two second GPUs; and wherein said graphics hub is further configured to provide signals to said at least two first GPUs by said first data bus and to said at least two second GPUs by said second data bus and said second parallel graphics rendering graphics hub to enable parallel graphics rendering using said at least two first GPUs and said at least two second GPUs.

3. The information handling system of claim 1, wherein said graphics hub of said first modular component is removeably coupled to receive data signals from said circuitry of said motherboard by a first interconnect and via a third data bus; and wherein said first additional modular component is removeably coupled to receive power and ground from circuitry of said motherboard by a second interconnect.

4. The information handling system of claim 3, wherein each of said first and second interconnects each comprise a peripheral component interconnect express (PCI-E) interconnect; wherein said third data bus comprises a PCI-E data bus; wherein said first interconnect acts to mechanically connect said first modular component to said motherboard; and wherein said second interconnect acts to mechanically connect said first additional modular component to said motherboard.

5. The information handling system of claim 3, wherein said information handling system comprises a desktop computer; wherein said first modular component is a graphics card that has a plug-in connector that is received in a first plug-in connector slot of said motherboard to removeably couple said graphics hub of said first modular component to receive data signals from said circuitry of said motherboard; and wherein said first additional modular component is a graphics card that has a plug-in connector that is received in a second plug-in connector slot of said motherboard to removeably couple said first additional modular component to receive power and ground from circuitry of said motherboard.

6. The information handling system of claim 3, wherein said information handling system comprises a notebook computer and a separate docking station for said notebook computer; wherein said notebook computer comprises said components of said first modular component; wherein said docking station comprises components of said; and wherein are is a graphics card that has a plug-in connector that is received in a first plug-in connector slot of said motherboard to removeably couple said graphics hub of said first modular component to receive data signals from said circuitry of said motherboard; and wherein said first additional modular component is a graphics card that has a plug-in connector that is received in a second plug-in connector slot of said motherboard to removeably couple said first additional modular component to receive power and ground from circuitry of said motherboard.

7. The information handling system of claim 1, comprising at least two first additional modular components that each includes at least one second GPU thereon, each of said second GPUs of said at least two first additional modular components being coupled to said graphics hub of said first modular component by a data bus that creates a signal path that is completely separate from said motherboard.

8. A portable information handling system assembly, comprising:
  a portable information handling system, said portable information handling system comprising:
    a motherboard including circuitry, and
    a first modular component including a first parallel graphics rendering graphics hub coupled by a first data bus to at least one first graphics processing unit (GPU) that is part of the first modular component, said first modular component being coupled to the motherboard of the information handling system such that said first parallel graphics rendering graphics hub receives signals from one or more components of said motherboard, and said first parallel graphics rendering graphics hub including a cascade-out port;
  a docking station for said portable information handling system, said docking station being configured to be removeably coupled to said portable information handling system by a docking expansion interconnect, and said docking station comprising:
    a first additional modular component separate from said first modular component, said first additional modular component including a second parallel graphics rendering graphics hub coupled to at least one second GPU that is part of said first additional modular component, the second parallel graphics rendering graphics hub having a cascade-in port being configured for coupling by a second data bus and said docking expansion interconnect to the cascade-out port of the first parallel graphics rendering graphics hub when said portable information handling system is docked with said docking station with said first additional modular component being coupled to said first modular component such that said first and second parallel graphics rendering graphics hubs are coupled together in cascade relationship with said first parallel graphics rendering graphics hub being coupled between said second parallel graphics rendering graphics hub and said motherboard and such that the second parallel graphics rendering graphics hub is only configured to exchange signals with the motherboard through the cascade-out port of the first parallel graphics rendering graphics hub and the cascade-in port of the second parallel graphics rendering graphics hub;
  wherein said first parallel graphics rendering is further configured to provide signals to said first GPU by said first data bus and to said second GPU by said second data bus via said docking expansion interconnect and said second parallel graphics rendering graphics hub to enable parallel graphics rendering using said first GPU and said second GPU.

9. The portable information handling system assembly of claim 8, wherein said first modular component includes at least two first GPUs thereon; wherein said first additional modular component includes at least two second GPUs thereon; and wherein said first parallel graphics rendering graphics hub is further configured to provide signals to said at least two first GPUs by said first data bus and to said at least two second GPUs by said second data bus via said docking expansion interconnect and said second parallel graphics rendering graphics hub to enable parallel graphics rendering using said at least two first GPUs and said at least two second GPUs.

10. The portable information handling system assembly of claim 8, wherein said portable information handling system comprises a notebook computer.

11. A method of configuring an information handling system, comprising:
  providing a motherboard including circuitry;
  providing a first modular component coupled to the motherboard, the first modular component including a first parallel graphics rendering graphics hub coupled by a first data bus to at least one first graphics processing unit (GPU) that is part of the first modular component, said first modular component being coupled to the motherboard of the information handling system such that said first parallel graphics rendering graphics hub receives signals from one or more components of said motherboard, and said first parallel graphics rendering graphics hub including a cascade-out port;
  providing a first additional modular component separate from said first modular component, said first additional modular component including a second parallel graphics rendering graphics hub coupled to at least one second GPU that is part of said first additional modular component, the second parallel graphics rendering graphics hub having a cascade-in port coupled by a second data bus to the cascade-out port of the first parallel graphics rendering graphics hub with said first additional modular component being coupled to said first modular component such that said first and second parallel graphics rendering graphics hubs are coupled together in cascade relationship with said first parallel graphics rendering graphics hub being coupled between said second parallel graphics rendering graphics hub and said motherboard and such that the second parallel graphics rendering graphics hub is only configured to exchange signals with the motherboard through the cascade-out port of the first parallel graphics rendering graphics hub and the cascade-in port of the second parallel graphics rendering graphics hub;

wherein said first parallel graphics rendering graphics hub is further configured to provide signals to said first GPU by said first data bus and to said second GPU by said second data bus and said second parallel graphics rendering graphics hub to enable parallel graphics rendering using said first GPU and said second GPU.

12. The method of claim 11, wherein said first modular component includes at least two first GPUs thereon; wherein said first additional modular component includes at least two second GPUs thereon; and wherein said first parallel graphics rendering graphics hub is further configured to provide signals to said at least two first GPUs by said first data bus and to said at least two second GPUs by said second data bus and said second parallel graphics rendering graphics hub to enable parallel graphics rendering using said at least two first GPUs and said at least two second GPUs.

13. The method of claim 11, further comprising selectably providing and coupling said first modular component to said motherboard and selectably providing and coupling said first additional modular component to said first parallel graphics rendering graphics hub of said first modular component only in response to an order from a customer that requires parallel graphics rendering capability.

14. A method of configuring a portable information handling system assembly, comprising:
providing a portable information handling system, said portable information handling system comprising:
a motherboard including circuitry, and
a first modular component including a first parallel graphics rendering graphics hub coupled by a first data bus to at least one first graphics processing unit (GPU) that is part of the first modular component, said first modular component being coupled to the motherboard of the information handling system such that said first parallel graphics rendering graphics hub receives signals from one or more components of said motherboard, and said first parallel graphics rendering graphics hub including a cascade-out port;
providing a docking station for said portable information handling system, said docking station being configured to be removeably coupled to said portable information handling system by a docking expansion interconnect, and said docking station comprising:
a first additional modular component separate from said first modular component, said first additional modular component including a second parallel graphics rendering graphics hub coupled to at least one second GPU that is part of said first additional modular component, the second parallel graphics rendering graphics hub having a cascade-in port being configured for coupling by a second data bus and said docking expansion interconnect to the cascade-out port of the first parallel graphics rendering graphics hub when said portable information handling system is docked with said docking station with said first additional modular component being coupled to said first modular component such that said first and second parallel graphics rendering graphics hubs are coupled together in cascade relationship with said first parallel graphics rendering graphics hub being coupled between said second parallel graphics rendering graphics hub and said motherboard and such that the second parallel graphics rendering graphics hub is only configured to exchange signals with the motherboard through the cascade-out port of the first parallel graphics rendering graphics hub and the cascade-in port of the second parallel graphics rendering graphics hub;

wherein said first parallel graphics rendering graphics hub is further configured to provide signals to said first GPU by said first data bus and to said second GPU by said second data bus via said docking expansion interconnect and said second parallel graphics rendering graphics hub to enable parallel graphics rendering using said first GPU and said second GPU.

15. The method of claim 14, wherein said first modular component includes at least two first GPUs thereon; wherein said first additional modular component includes at least two second GPUs thereon; and wherein said first parallel graphics rendering graphics hub is further configured to provide signals to said at least two first GPUs by said first data bus and to said at least two second GPUs by said second data bus via said docking expansion interconnect and said second parallel graphics rendering graphics hub to enable parallel graphics rendering using said at least two first GPUs and said at least two second GPUs.

16. The method of claim 14, wherein said portable information handling system comprises a notebook computer.

17. A scaleable circuit assembly for an information handling system, comprising:
a first modular component including a first parallel graphics rendering graphics hub coupled to at least one graphics processing unit (GPU) that is part of the first modular component, said first modular component being coupled to a motherboard of an information handling system such that said first parallel graphics rendering graphics hub receives signals from one or more components of said motherboard, and said first parallel graphics rendering graphics hub including a cascade-out port; and
a first additional modular component separate from said first modular component, said first additional modular component including a second parallel graphics rendering graphics hub coupled to at least one GPU that is part of said first additional modular component, the second parallel graphics rendering graphics hub having a cascade-in port coupled to the cascade-out port of the first parallel graphics rendering graphics hub with said first additional modular component being coupled to said first modular component such that said first and second parallel graphics rendering graphics hubs are coupled together in cascade relationship with said first parallel graphics rendering graphics hub being coupled between said second parallel graphics rendering graphics hub and said motherboard and such that the second parallel graphics rendering graphics hub is only configured to exchange signals with the motherboard through the cascade-out port of the first parallel graphics rendering graphics hub and the cascade-in port of the second parallel graphics rendering graphics hub; and
where the second parallel graphics rendering graphics hub of the first additional modular component further comprises a cascade-out port configured for coupling to a cascade-in port of a third parallel graphics rendering graphics hub of a second additional modular component separate from said first modular component and said first additional modular component.

18. The scaleable circuit assembly of claim 17, wherein said first modular component includes at least two GPUs that are part of the first modular component and that are coupled to said first parallel graphics rendering graphics hub of said first modular component; and wherein said first additional modular component includes at least two GPUs that are part of the first additional modular component and that are coupled to said second parallel graphics rendering graphics hub of said first additional modular component.

19. The scaleable circuit assembly of claim 17, further comprising the second additional modular component separate from said first modular component and said first additional modular component, said second additional modular component including the third parallel graphics rendering graphics hub and at least one GPU that is part of the third modular component and that is coupled to the third parallel graphics rendering graphics hub; where the cascade-in port of the third parallel graphics rendering graphics hub is coupled to the cascade-out port of the second parallel graphics rendering graphics hub with said first additional modular component being coupled to said first modular component such that said first and second parallel graphics rendering graphics hubs are coupled together in cascade relationship, and with said second additional modular component is coupled to said first additional modular component such that said second parallel graphics rending graphics hub is coupled between said first and third parallel graphics rendering graphics hubs and such that the third parallel graphics rendering graphics hub is only configured to exchange signals with the motherboard and the first modular component through the cascade-out port of the first additional parallel graphics rendering graphics hub and the cascade-in port of the third parallel graphics rendering graphics hub; and where the third parallel graphics rendering graphics hub of the second additional modular component further comprises a cascade-out port configured for coupling to a cascade-in port of a fourth parallel graphics rendering graphics hub of a third additional modular component separate from said first modular component, said first additional modular component, and said second additional modular component.

20. The scaleable circuit assembly of claim 17, wherein each of said first modular component and said first additional modular component are configured as modular bookshelf units.

21. The scaleable circuit assembly of claim 17, further comprising a docking station for a portable information handling system; wherein said first modular component and said first additional modular component are each configured to be removeably mechanically attachable as modular components to said docking station; and wherein said docking station comprises a data bus connector for receiving a corresponding data bus connector of a portable information handling system notebook in a manner to removeably couple a motherboard of said portable information handling system to said modular components of said docking station.

22. An information handling system comprising the scaleable circuit assembly of claim 17.

23. The scaleable circuit assembly of claim 17, where the cascade-out port of the first parallel graphics rendering graphics hub of the first modular component is configured to provide data to both the GPU that is part of the first modular component and to the cascade-in port of the second parallel graphics rendering graphics hub of the first additional modular component; and where the second parallel graphics rendering graphics hub is configured to in turn deliver the provided data to the GPU of the first additional modular component.

24. A method of configuring a portable information handling system assembly, comprising:
providing an information handling system, said information handling system comprising a motherboard;
providing a first modular component including a first parallel graphics rendering graphics hub coupled to at least one graphics processing unit (GPU) that is part of the first modular component with said first parallel graphics rendering graphics hub including a cascade-out port, and coupling said first modular component to said motherboard of said information handling system such that said first parallel graphics rendering graphics hub receives signals from one or more components of said motherboard; and
providing a first additional modular component separate from said first modular component, said first additional modular component including a second parallel graphics rendering graphics hub coupled to at least one GPU that is part of said first additional modular component with the second parallel graphics rendering graphics hub having a cascade-in port, and coupling the cascade-out port of the first parallel graphics rendering graphics hub to the cascade-in port of the second parallel graphics rendering graphics hub in cascade relationship to couple said first additional modular component to said first modular component such that said first and second parallel graphics rendering graphics hubs are coupled together with said first parallel graphics rendering graphics hub being coupled between said second parallel graphics rendering graphics hub and said motherboard and such that the second parallel graphics rendering graphics hub only exchanges signals with the motherboard through the cascade-out port of the first parallel graphics rendering graphics hub and the cascade-in port of the second parallel graphics rendering graphics hub; and
where the provided second parallel graphics rendering graphics hub of the first additional modular component further comprises a cascade-out port configured for coupling to a cascade-in port of a third parallel graphics rendering graphics hub of a second additional modular component separate from said first modular component and said first additional modular component.

25. The method of claim 24, further comprising:
using the cascade-out port of the first parallel graphics rendering graphics hub of the first modular component to provide data to both the GPU that is part of the first modular component and to the cascade-in port of the second parallel graphics rendering graphics hub of the first additional modular component; and
then using the second parallel graphics rendering graphics hub to deliver the provided data to the GPU of the first additional modular component.

* * * * *